United States Patent [19]

Rosa et al.

[11] 4,274,135
[45] Jun. 16, 1981

[54] GATING CIRCUIT FOR HIGH VOLTAGE THYRISTOR STRINGS

[75] Inventors: John Rosa; Laszlo Gyugyi, both of Penn Mills, Pa.

[73] Assignee: Westinghouse Electric Corp., Pittsburgh, Pa.

[21] Appl. No.: 6,831

[22] Filed: Jan. 26, 1979

[51] Int. Cl.³ .............................................. H02M 7/00
[52] U.S. Cl. ................................. 363/68; 307/252 K; 307/252 Q
[58] Field of Search ............ 307/252 J, 252 K, 252 L, 307/252 M, 252 N, 252 Q, 252 T; 363/67, 68

[56] References Cited

U.S. PATENT DOCUMENTS

| | | | |
|---|---|---|---|
| 3,386,027 | 5/1968 | Kilgore et al. | 363/68 |
| 3,388,269 | 6/1968 | Bertioli | 307/252 T |
| 3,581,114 | 5/1971 | Gregson | 307/252 T |
| 3,612,904 | 10/1971 | Moe | 307/252 T X |
| 3,999,117 | 12/1976 | Gyugyi et al. | 323/119 |
| 4,084,221 | 4/1978 | Ogata | 363/68 X |

*Primary Examiner*—William M. Shoop
*Attorney, Agent, or Firm*—M. J. Moran

[57] ABSTRACT

Electrical apparatus such as a VAR generator or convertor is taught for high-voltage application. The electrical apparatus includes series stacked silicon controlled rectifiers, some of which operate at high electrical potential. Switching information is provided to the thyristors by way of insulating light pipes. The energy for actuating the gate of the thyristor in each case is provided by a current transformer which in some instances is interconnected with the anode of the thyristor in question to monitor the anode current thereof in a previous half cycle of conduction. In other instances, anode current of another thyristor are monitored. The anode current is converted to stored charge which is later released through a light actuated switch to the gate for energization of the thyristor in question. This means that a thyristor may be repeatedly energized even after many intervals of full cycle conduction where no anode to cathode potential is available for charging a capacitor.

16 Claims, 4 Drawing Figures

GATING CIRCUIT FOR HIGH VOLTAGE THYRISTOR STRINGS

BACKGROUND OF THE INVENTION

The subject matter of this invention relates generally to gating circuits for high voltage series connected thyristor strings, and more particularly, to gating circuits utilizing current transformers as energy sources.

It is well known to use gate controlled thyristors to control the conduction interval in a conductor connected between two voltage potentials. During a conduction interval, the thyristor switch is gated on and acts as a conductor path connecting the two sources of electrical potential, one with the other, usually through a suitable impedance for current limiting purposes. During a controlled period of nonconduction, the thyristor acts as an open circuit and therefore is subjected to the voltage difference between the two voltage potentials. In the latter situation, the physical characteristic of the thyristor must be such as to resist voltage breakdown. Every thyristor device has a maximum voltage blocking figure beyond which voltage breakdown will occur. In high voltage situations, the aforementioned voltage figure may be insufficient if only one thyristor is utilized. Consequently, a series string of synchronously controlled thyristors is used, each of which is proportionately subjected to reduced breakdown voltage. In the foregoing situation, each of the thyristors usually easily accommodates its proportional share of blocking voltage; however, close scrutiny will indicate that another voltage problem may exist in some instances. In particular, the cathode of some or all of the thyristors in the string of thyristors may be at high potentials, even though the net voltage across the thyristor is within the voltage blocking capability of the thyristor. Since thyristors are controllable devices, energy must be made available at the cathode potential of the thyristor for causing a gating action in the thyristor at an appropriate time and under appropriate circumstances. It is to be noted that the amount of energy per gating action is usually small, in the order of 10 millijoules; however, the voltage potential at which this energy is utilized may be relatively high. Consequently, one who is utilizing high voltage thyristor strings is faced with the problem of delivering the relatively small amount of energy to control a thyristor whose cathode is at a relatively high voltage potential. In the past, a number of solutions have been provided to solve the aforementioned problem. One solution is to produce the required energy at ground potential and then feed the energy through cascaded transformers to the high potential of the cathode of the thyristor. This is sometimes known as a "magnetic" solution (because of the reliance on transformers). It has the disadvantage of requiring the utilization of numerous transformers which lead to weight, volume, size, cost and manufacturing problems because of the insulation that is necessary to isolate the high cathode potential at which the energy is utilized from ground potential at which the energy is produced. A solution to the above-mentioned problem is to derive the energy at the cathode potential of the thyristor. This is done by means of a voltage divider network which is usually added to the R-C snubber circuit of the thyristor. The voltage divider network usually comprises a suitably sized capacitor, one electrode of which is connected to the thyristor cathode and the other of which is connected to a portion of the snubber network. The capacitor charges as voltage is developed across it when the thyristor is in a nonconducting stage; however, it is to be realized that voltage must be developed across the capacitor to provide the energy which is later utilized to fire the gate of the thyristor. The voltage may come from the terminals of the thyristor in question or from another thyristor, but voltage of the proper polarity must be present in order to charge the capacitor. This is sometimes known as the "voltage divider solution". Although there are many areas in which the above-mentioned problem may be significant, two interesting areas are associated with converter bridges and VAR generators. A converter bridge application of thyristors is taught in U.S. Pat. No. 3,386,027, issued May 28, 1968 to L. A. Kilgore et al and entitled, "High Voltage Converter Apparatus Having A Plurality Of Serially Connected Controllable Semiconductor Devices" (assigned to the assignee of the present invention). It is not necessary at this time to explain the dynamics of the operation of a converter as the aforementioned patent describes that in detail. It is sufficient for purposes of this invention to realize that in a converter situation (or for AC control of resistors) the voltage across any thyristor may vary over a wide range, and may even be zero. This depends on the momentary operating conditions of the system. Obviously, in such systems, the previously mentioned "voltage divider approach" is ineffective. Another area in which the string of thyristors is used is the VAR generator situation. A typical VAR generator is disclosed in U.S. Pat. No. 3,999,117, issued Dec. 21, 1976 to Gyugyi et al and entitled, "Method And Control Apparatus For Static VAR Generator And Compensator" (assigned to the assignee of the present invention). Once again, the description of the operation of a VAR generator is not critically important for this application as it is well described in the latter-mentioned patent. In the latter situation, overvoltage for each thyristor can become a significant problem. It will be remembered that each thyristor is generally sized so that it can accommodate a certain predetermined amount of blocking voltage; however, in some instances which may be associated with load shedding, lightning or other transient phenomena for instance, the voltage impressed across the string of thyristors may be so high as to jeopardize the voltage blocking limits of each thyristor. In such a case, one of two things can be done. The overvoltage can be anticipated in the design of the thyristor string, thus leading to conservative blocking voltage levels. This obviously works, but creates the undesirable problem of unnecessary blocking voltage capacity when most of the time a non-overvoltage situation will exist. This tends to be an inefficient use of the thyristors. Another solution is to merely deliberately cause all thyristors to conduct during a sensed overvoltage situation. The well known reactance which is connected in series with the various thyristors in the VAR generator situation acts to limit any current which may flow, while the conducting thyristors are not faced with an undesirable voltage blocking situation. In order to do this, voltage must be present. It may be that the thyristor network must accommodate overvoltage for longer than one-half cycle, in which case, subsequent firings of the thyristors will be jeopardized because of the absence of charging voltage during a previous half-cycle. Regardless of whether the converter situation or the VAR generator situation is examined, it becomes apparent that a situation can arise in which no energy is available for firing the thyristors because of the lack of charging voltage during a previous interval. Corollary to this is the realization that in those cases in which no voltage is present for charging the capacitor, there is likely to be significant current conducted by the thyristor. It would be advantageous, therefore, if a way could be found to utilize the conducting aspects of the thyristor, i.e., its current during a conduction interval, to provide energy during an initial portion of a half-cycle, for example, or to provide energy during other half cycles which energy ultimately is utilized to charge a capacitor or other wise deliver energy to the gate of the thyristor or silicon controlled rectifier for actuating the gate to cause conduction.

SUMMARY OF THE INVENTION

In accordance with the invention, a current actuated bi-polar switch is taught. The switch comprises a first unidirectional switch means with main conducting terminals for interconnection with a circuit to be controlled thereby and with an actuating terminal for causing current conduction at the main terminals thereof. There is also a second unidirectional switch means with main terminals for interconnection with the circuit to be controlled, but which is in opposite circuit polarity to the first switch. The second switch means also has an actuating terminal for causing the second switch means to conduct the current when the latter actuating terminal is energized. There is a first electrical energizing means disposed in cooperation with the main terminals of the first switch means. The first energizing means has an output terminal which provides electrical energy in relation to the current flow at the main terminals of the first switch means. Likewise, there is a second electrical energizing means disposed in cooperation with the main terminals of the second switch means. The second energizing means has an output terminal which provides energy in relation to the current flow at the main terminals of the second switch means. There is first energy storage means interconnected with the actuating terminal of the first switch means and the output terminal of the second electrical energizing means. The first energy storage means stores energy which is provided thereto by the second energizing means and releases the energy to the actuating terminal of the second electrical energizing means at an appropriate time for making the main terminals of the first switch means conductive. Also, there is a second energy storage means which is interconnected with the actuating terminal of the second switch means and the output terminal of the first electrical energizing means for storing energy which is provided thereto by the first energizing means and for releasing that energy to the actuating terminal of the second switch means at an appropriate time for making the main terminals of the second switch means conductive.

BRIEF DESCRIPTION OF THE DRAWINGS

For a better understanding of the invention, reference may be had to the preferred embodiments thereof shown in the accompanying drawings, in which.

DESCRIPTION OF THE PREFERRED EMBODIMENTS

Figure 1:
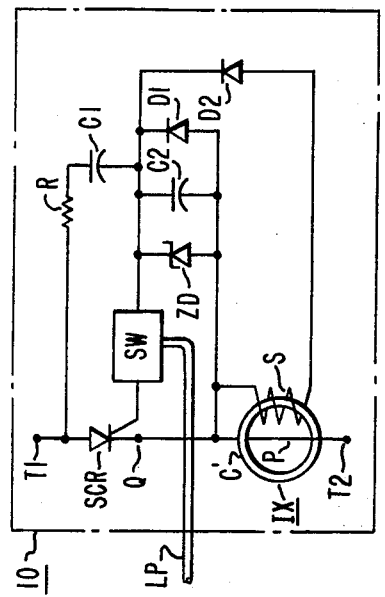
FIG. 1 shows a schematic circuit diagram of a thyristor circuit with gate energizing means.

Referring now to the drawings, and FIG. 1 in particular, a high voltage thyristor circuit 10 is shown. The high voltage thyristor circuit 10 includes a thyristor or silicon controlled rectifier SCR. The anode of the silicon controlled rectifier or thyristor SCR is connected to one terminal of a resistive element R, the other terminal of which is connected to one side of a first capacitive element C1. The gate of the silicon controlled rectifier SCR is connected first to one side of a light actuated switch SW, the other side of which is connected jointly to the regulating terminal of a zener diode ZD, one terminal of a capacitive element C2, one terminal of a diode D1, one terminal of another diode D2 and the other terminal of the capacitive element C1. The other terminals of the zener diode ZD, the capacitive element C2 and the diode D1 are connected together and to the cathode terminal Q of the silicon controlled rectifier or thyristor SCR. The latter mentioned cathode terminal Q also represents the main terminal T2 of the thyristor circuit 10. Likewise, the anode of the silicon controlled rectifier represents the other terminal T1 of the thyristor circuit 10. The electrical conductor which exists between the cathode Q and the terminal T2 is surrounded by the core C of a current transformer IX. Thus, the conductor acts as a single-turn primary winding P of the current transformer IX. The secondary S of the current transformer is connected at one terminal thereof to the cathode terminal Q of the silicon controlled rectifier SCR and at the other terminal thereof to the other side or anode of the diode D2. The exemplary embodiment 10 of the thyristor circuit which includes the silicon controlled rectifier SCR utilizes the cathode terminal Q as a common terminal for zener diode ZD, the capacitive element C2, the normal diode D1 and the secondary winding S of the current transformer IX.

OPERATION OF THE THYRISTOR CIRCUIT 10

It is well known that the presence of a gate signal at the gate terminal of the silicon controlled rectifier SCR when positive voltage exists across the terminal T1 and T2 in that polarity, causes conduction through the silicon controlled rectifier SCR with little voltage drop between the anode and cathode thereof. Likewise, at the first current reversal after removal of the gate signal, conduction is extinguished in the silicon controlled rectifier SCR with the impression of the full voltage existing at the terminals T1 and T2 across the anode to cathode of the silicon controlled rectifier SCR. During a non-conducting interval, that is, when the silicon controlled rectifier SCR is off, the voltage which exists between the terminal T1 and the terminal T2 causes current to flow through the resistive element R, the capacitive element C1 and the capacitive element C2, thus building a voltage potential across the capacitive elements C1 and C2 with the well known voltage divider characteristics. In a preferred embodiment of the invention, the relative capacitance values of the capacitive elements C1 and C2 may be chosen so that most of the voltage of the voltage divider network is across the element C1 and significantly less voltage is across the element C2. It is to be understood, of course, that the resistive element R and the capacitive element C1 form what is commonly known as a snubber network for a silicon controlled rectifier or thyristor. This network operates in conjunction with the capacitive element C2 on positive half cycles of voltage, as measured from terminal T1 to terminal T2 and cooperates with the diode element D1 on negative half cycles of voltage. Generally, the snubber circuit provides two important functions, the first of which is to prevent high rates of change of voltage from affecting the silicon controlled rectifier or thyristor SCR; and the second of which is to sweep out charge from a previously conducting silicon controlled rectifier or SCR, to therefore assist in equalizing the voltage across each thyristor element in a stack or string of thyristor elements. It is advisable to limit the voltage across the capacitive element C2, it being recognized that variations in voltage between terminals T1 and T2 can be reflected in the voltage divider concept represented by the capacitive elements C1 and C2, resulting in corresponding voltage variation across the capacitive element C2 which is not desired in the present situation. To limit the voltage across the capacitive element C2, a zener diode ZD is connected thereacross. In the event that the voltage across the capacitive element C2 attempts to rise above a predetermined voltage, the zener diode ZD will operate to prevent that from happening. The diode element D1 is interconnected with the capacitive element C1 and the resistive element R1 to complete the snubber circuit for negative half cycles of voltage between terminals T1 and T2 and to force charge to flow into the capacitive element C2 during positive half cycles of the voltage. The secondary S of the current transformer IX is interconnected with one side of the capacitive element C2 and through a unidirectional diode D2 to the other side of the capacitive element C2. Consequently, on appropriate half cycles of anode current in the SCR, a voltage is induced across the secondary S of sufficient magnitude to forward bias the diode D2, thus causing current to flow into the capacitive element C2 independent of current supplied through the resistive element R and the capacitive element C1. Consequently, it can be seen that in this embodiment of the invention, capacitive element C2 can be charged in relationship to current being conducted through the silicon controlled rectifier or thyristor SCR. This means that the energy storage capacitor C2 can be made available for a subsequent energizing action even though no significant positive voltage has previously existed between the terminals T1 and T2. As was described previously, this situation often exists in a converter where the amount of voltage across the conducting silicon controlled rectifier may be of low or minimum value. Once the capacitive element C2 has been fully charged, either by the voltage divider network in relationship to a voltage impressed across the terminals T1 and T2 or by the effect of a conducting silicon controlled rectifier, the energy represented by the stored charge can be utilized to actuate the gate terminal of the silicon controlled rectifier by the operation of closing the switch SW. The switch SW is controlled by a light pipe LP. This means that a light signal can be sent to the switch SW for closing the switch SW and allowing energization of the silicon controlled rectifier or thyristor SCR at the voltage potential of the cathode of the silicon controlled rectifier SCR. This is true even though the source of the control signal at the other end of the light pipe (not shown in FIG. 1) is at a significantly different potential than the potential of the switch SW.

Figure 2:
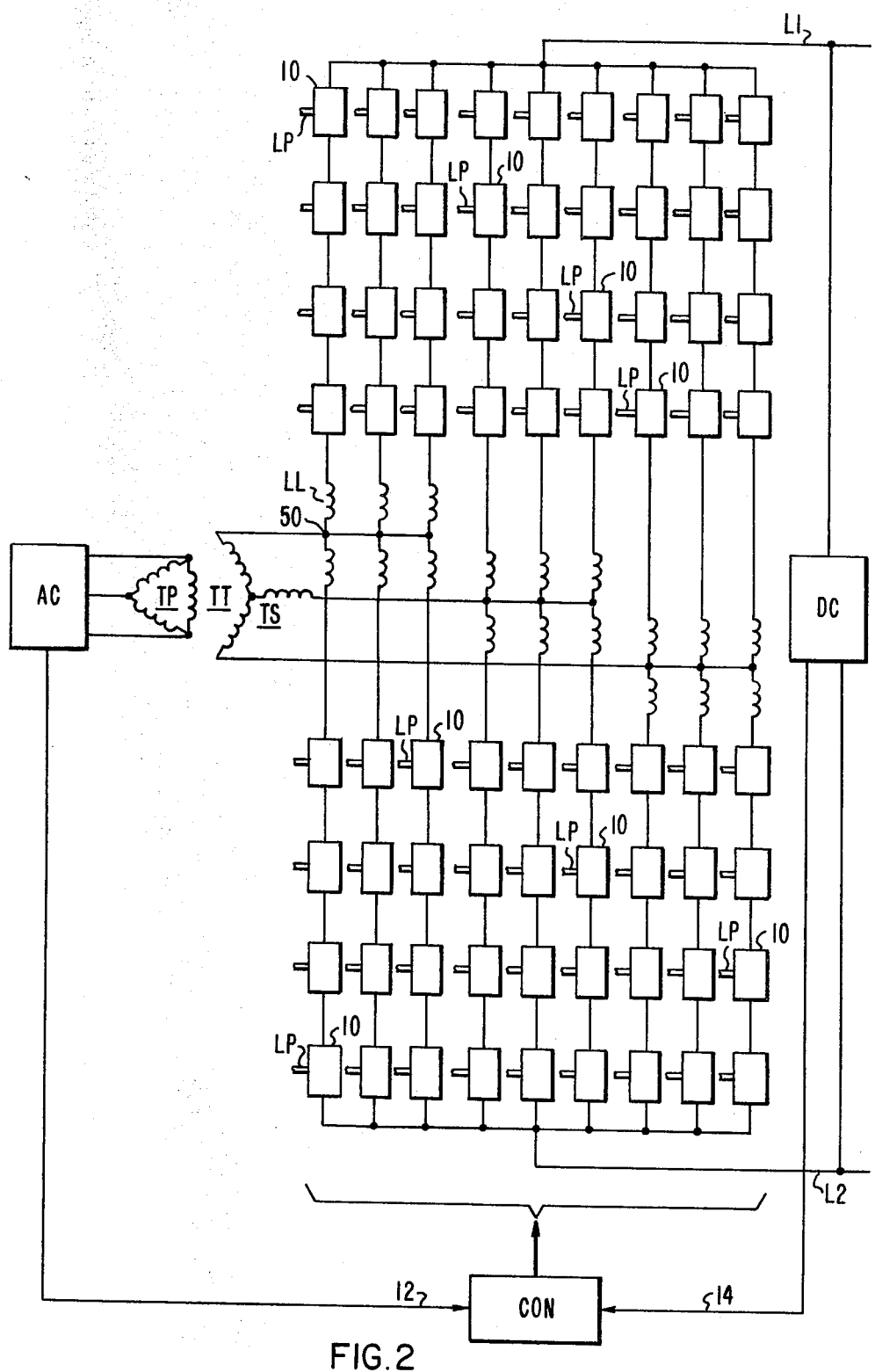
FIG. 2 shows a schematic diagram of a converter circuit which utilizes the thyristor circuit of FIG. 1.

Referring now to FIG. 2, a converter circuit acceptable for using the silicon controlled rectifier assembly 10 of FIG. 1 is shown. The operation of a converter circuit is well known; but for purposes of simplicity of illustration, it is noted that a converter essentially is utilized for converting DC to AC or vice versa. The DC circuit is interconnected between the lines L1 and L2, which in turn are connected to appropriately arranged stacks of silicon controlled rectifier assemblies 10, such as shown in FIG. 1. The primary winding TP of a transformer TT is connected in the familiar delta configuration and is magnetized by an AC source. The secondary winding TS of the transformer TT is interconnected by way of the stacks 10 to the DC circuit. The secondary winding may be in the Y configuration and may be interconnected with inductors LL for the thyristor snubber circuit; a suitable control CON is provided which is interconnected to both the AC circuit by way of line 12 and the DC circuit by way of line 14 to sense variables in the aforementioned AC and DC for supplying signals by way of various light pipes LP in a manner described previously with respect to FIG. 1. This causes certain combinations of silicon controlled rectifier assemblies 10 to conduct current under appropriate circumstances to thus cause an appropriate action to occur in either the AC or DC circuit or both. In the embodiment of the invention shown in FIG. 2, each three-phase line of the primary winding TP of the transformer TT is connected to the midpoints of unidirectional oriented stacks of thyristor elements 10 which are arranged in non-limiting 3×4 matrices in this embodiment. In particular, each AC line is interconnected with three stacks of silicon controlled rectifier assemblies 10 for essentially three fold the current carrying capabilities thereof. Each stack of silicon controlled rectifier assemblies as shown in the embodiment of FIG. 2 shows four serially connected silicon controlled rectifier assemblies 10 for increasing the voltage potential of a representative replacement single silicon controlled rectifier assembly by a factor of 4. It is to be understood that in the embodiment of FIG. 2 all of the blocks shown therein are presumed to comprise one of the silicon controlled rectifier assemblies 10 of FIG. 1. It can be seen that the four leftmost upper rectifier assemblies 10 comprise a stack of rectifier assemblies, each of which has one-fourth of the voltage which exists between the electrical point 50 and the electrical line L1 impressed thereacross. In actuality, the entire voltage between the line L1 and L2 is supported by eight rectifier assemblies oriented vertically on the far left of the stacks of FIG. 2 between the line L1 and the line L2. Presuming that an instantaneous voltage condition exists where the line L2 is at zero potential, for example, and the line L1 is at maximum potential with respect to ground, it can be seen that the uppermost silicon controlled rectifier assembly 10 is at maximum potential in the stack shown to the left in FIG. 2, whereas the lowermost assembly is at essentially zero potential. The light pipes LP represented in FIG. 1 and shown in the third rectifier assembly down in the left stack of FIG. 2, all interconnect at the other end thereof with the control CON. The upper portions thereof are at varying different potentials. However, this is relatively insignificant as the light pipes LP are constructed of a high insulating material and are not meant to carry electrical current but merely light energy for the purpose of triggering appropriate light sensitive thyristor assemblies 10 for causing conduction. With the arrangement shown in FIG. 2 there is no need to supply the energy for triggering from the control system to each of the silicon controlled rectifier assemblies 10 as the energy is essentially self derived within each block 10 in a manner described previously with respect to FIG. 1. It can be seen, therefore, that there is no electrical interconnection between the control CON which is presumed in this embodiment of the invention to be at or near ground potential and any of the silicon controlled rectifier assemblies 10 which may be at different potentials, up to and including the maximum potential between ground and any of the lines L1 or L2. The converter depicted in FIG. 2 is useful for transferring electrical power from an AC system shown on the left to a DC system shown on the right or vice versa, depending upon what is desired.

Figure 3:
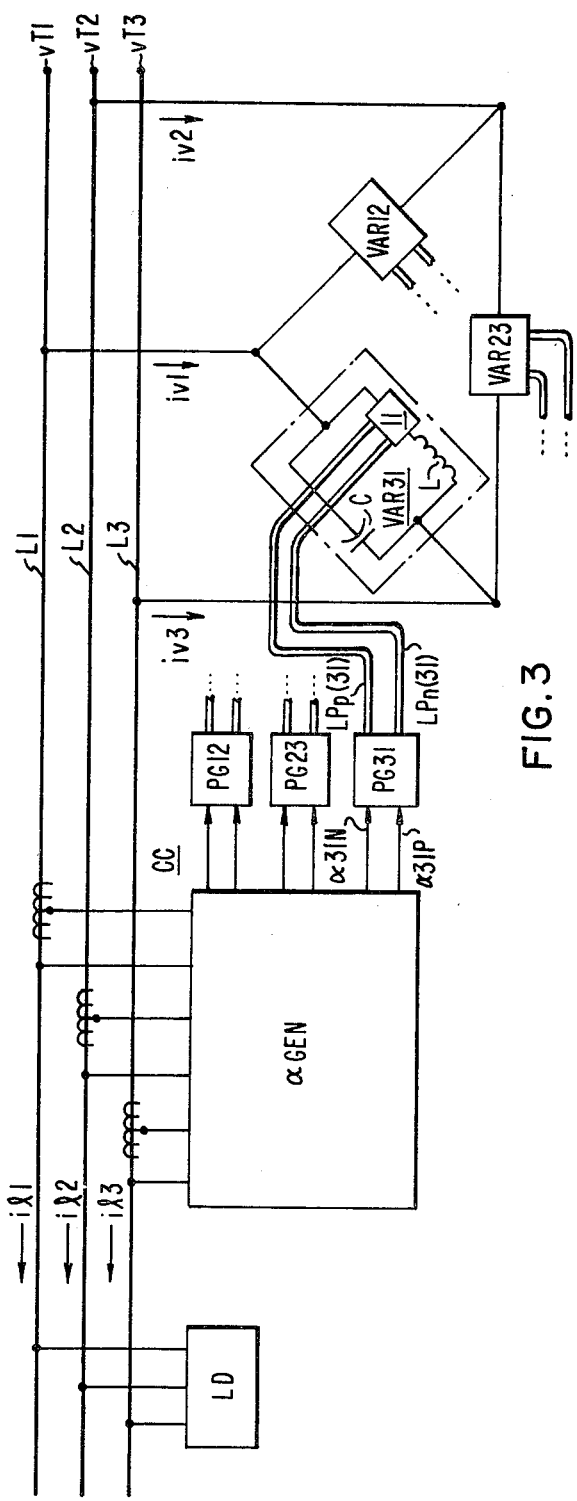
FIG. 3 shows a schematic diagram of a VAR generator circuit and a control therefor.

Referring now to FIG. 3, a VAR generator (volt-ampere reactive) which utilizes the concept of the present invention is shown. The three AC lines L1, L2, and L3 have terminal voltages vT1, vT2 and vT3, respectively. A load LD is shown interconnected at the left of the lines L1, L2, and L3. Currents i11, i12 and i13 are shown flowing in the lines L1, L2 and L3, respectively. There is provided on the left, a control CC which is interconnected at inputs thereof with the lines L1, L2 and L3 to sense system voltage and system current. The input portion of the control CC omprises apparatus for computing the phase back angle for thyristors, which apparatus is generally known as an alpha generator αGEN. The output of the alpha generator comprises phase back angle signals for the thyristors of a VAR generator. In particular, representative signals α31N, α31P are provided from the right terminal of the alpha generator. These signals are provided to a pulse generator PG31, which in turn provides output light signals along light pipes LPN31 and LPP31, respectively. In a like manner, there are interconnections between the alpha generator and a pulse generator PG23 and the alpha generator and a pulse generator PG12 which cause light signals to be generated in correspondence with calculated phase back angles (conduction or complementary angles of) for the appropriate thyristors. To the right in FIG. 3 is shown a three phase delta connected representative VAR generator. Interconnected between lines L1 and L3 is a typical VAR generator section VAR 31 which includes a capacitive element C connected in parallel with any inductive element L. The inductive element L is connected in series with a thyristor switch 11 having inputs connected to the previously described light pipes LPN31 and LPP31. Likewise, there is a representative VAR generator VAR12 shown interconnected between lines L1 and L2 and a representative VAR generator VAR23 connected between lines L2 and L3. These VAR generators cooperate with the signals from the pulse generators PG12, PG23 and PG31 in appropriate circumstances to cause currents iv1, iv2 and iv3 to flow into or out of lines L1, L2 and L3, respectively for the purpose of compensating for the effects and changes in certain circuit parameters in the main electrical lines L1, L2 and L3 caused by the load LD. In typical embodiments, terminal voltages vT1, vT2 and vT3 may be regulated by the judicious control of the previously mentioned VAR currents iv1, iv2 and iv3, respectively. The magnitude of any of these currents during each half cycle is determined by the conduction angle of the switch 11, for example, which in turn controls a component of inductive current through the inductive reactance L which is used to offset in a controlled fashion a portion of the fixed current which flows through the capacitive element C. Detailed operation of a VAR generator may be found in the previously mentioned Gyugyi, U.S. Pat. No. 3,999,117.

Figure 4:
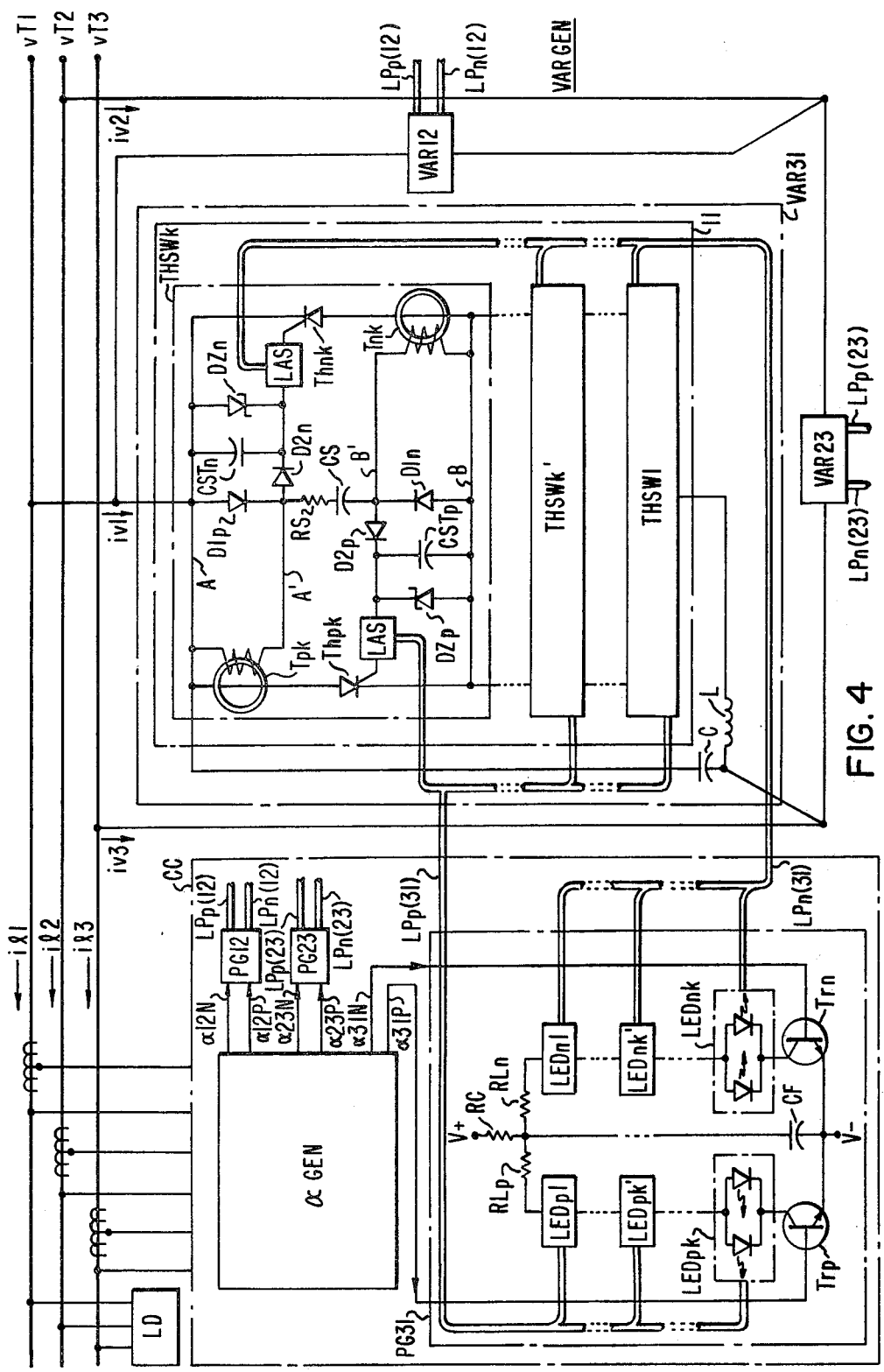
FIG. 4 shows a more detailed schematic diagram of the VAR generator circuit of FIG. 3.

Referring now to FIG. 4, the schematic block diagram associated with the VAR generator of FIG. 3 is expanded to show an embodiment of the present invention in which stacked thyristors are utilized for desirable purposes. The expansion is especially relevant to the pulse generator PG31 shown in FIG. 3 and the bipolar controlled silicon rectifier switch assembly 11 shown in FIG. 3. It will be noted that all other portions of FIG. 4 are essentially the same as shown in FIG. 3 and will not be further described hereinafter for purpose of simplicity of illustration. With regard to the bipolar stacked array of thyristor switch assemblies 11, it can be seen that the unitary switch 11 of FIG. 3 is represented by a multiplicity of stacked stages in FIG. 4. In particular, a first stage THSW1 is shown as a block diagram. A last stage THSWk and an intermediate stage THSWk' are also shown in schematic form. Each of the stages is essentially the same, except that it can be expected that the cathode potential of the respective thyristors therewithin varies according to the disposition of the stage within the stack. For purposes of simplicity of illustration, it is to be noted that since the switch THSWk is essentially the same as the switch THSWk' except for the voltage potential at which it resides during a nonconduction interval, only the operation of the switch THSWk will be described, as it is to be presumed that the operation of the switch THSWk' is essentially the same. It is to be understood that like reference symbols between the two aforementioned switch stages are differentiated only by the presence of the prime character ('). The bipolar switch THSWk comprises on the left a positive thyristor or silicon controlled rectifier Thpk oriented in a first direction and having connected to the gate thereof a light activated switch LAS. Connected to the other terminal or input terminal of the light actuated switch LAS is the regulating terminal of a zener diode DZp, one terminal of a capacitive element CSTp and the cathode of a normal diode D2p. In a like manner, there is provided an oppositely oriented silicon controlled rectifier or thyristor Thnk. Connected to the gate thereof is a second but similar light actuated switch LAS, to the input of which is connected the regulating terminal of a zener diode DZn, one terminal of a capacitive element CSTn and the cathode of a diode D2n. Connected between the anode of the diode D2p and the anode of the diode D2n is a snubber combination, as described previously, comprising a resistive element RS connected in series with a capacitive element CS. Connected to the junction between the capacitive element CS and the anode of the diode D2p is the cathode of another diode D1n. Likewise, connected to the junction between the anode of the diode D2n and the resistive element RS is the cathode of a diode D1p. There is provided around the anode lead of the silicon controlled rectifier THpk the core of a current transformer Tpk. Likewise, around the anode conductor of the silicon controlled rectifier Thnk is the core of a current transformer Tnk. The secondary of the current transformer Tpk has one side thereof connected to the anode conductor of the thyristor Thpk and to the anode of the diode D1p, the other terminal of the capacitive element CSTn, the other terminal or anode terminal of the zener diode DZn, and the cathode of the thyristor Thnk. The other terminal of the secondary of the current transformer Tpk is connected to the common junction between the anode of the diode D2n, the cathode of the diode D1p and the one terminal of the resistive element RS. Connected to one terminal of the secondary winding of the current transformer Tnk is the anode of the diode D1n, the other terminal of the capacitive element CSTp, the anode of the zener diode DZp and the cathode of the previously described thyristor Thpk. The other terminal of the secondary winding of the current transformer Tnk is connected to the common junction between the anode of the diode D2p, the cathode of the diode D1n and the common terminal of the capacitive element CS. The common terminal identified with the anode of the diode D1p is identified as the A terminal; while the common terminal associated with the cathode of the diode D1p is designated as the A′ terminal. In a like manner, the common terminal associated with the anode of the diode D1n is identified as the B terminal; while the common terminal associated with the cathode of the diode D1n is identified as the B′ terminal. (The anode of the diode Thpk and the cathode of the diode Thnk are interconnected together in a common junction with line 11. The main conducting path associated with the anode of the thyristor Thpk interconnects with the THSWk′ stage and the THSW1 stage. Likewise, the conduction path associated with the cathode of the thyristor Thnk interconnects with the THSWk′ stage and the THSW1 stage. To the output or common junction of the THSW1 stage is connected the previously described inductive element L. Connected in parallel with the various stages THSWk, THSWk′, THSW1 and the inductive element L is the capacitive element C, also described previously with respect to FIG. 3.

OPERATION OF THE THYRISTOR SWITCH THSWk

The electrical energy required to gate the thyristor Thpk, for example, which conducts an arbitrarily chosen positive half cycle of current, is located in the storage capacitor CSTp. Similarly, the capacitive element CSTn stores the energy required to gate the negative current carrying thyristor Thnk. A thyristor is gated by discharging its storage capacitor into the thyristor gate via the light activated switch LAS. The light energy required to actuate or close the light actuated switch LAS is conducted through fiber optics cables or bundles LPp(31) and LPn(31) for the oppositely oriented thyristors Thpk and Thnk, respectively. In this embodiment of the invention the light energy is conducted from ground potential where the receiving end is illuminated by light emitting diodes LEDp and LEDn, respectively, the operation of which will be described hereinafter. For purposes of illustration, assume that a particular thyristor switch is not conducting current, but rather is blocking voltage. If this occurs during an arbitrarily chosen positive half cycle, the positive thyristor should be ready for gating. Line A of the switch THSWk is positive with respect to line B. Diodes D1p and D2p will thus permit current flow through the resistor RS to charge capacitors CS and CSTp. Since the capacitance of the capacitor CSTp may be about twenty times that of CS, most of the voltage will be supported by the capacitive element CS, and only about 5% will fall across the capacitive element CSTp. Part of this may be further clipped by the zener diode DZp, which establishes a voltage of fixed amplitude across the storage capacitor CSTp even though the voltage across lines A and B may vary over a wide range. It can be seen that during a voltage half cycle of opposite polarity, storage capacitor CSTn will be charged through diodes D1n and D2n via resistive element RS and capacitive element CS. In addition to acting as a capacitive voltage divider and charge circuit, components RS and CS are also part of a snubber circuit, as described previously with respect to FIG. 1. With the storage capacitors CSTp and CSTn charged, the various circuits are armed for gating and at an appropriate time, the light actuated switches LAS may be energized, causing flow of the charges stored in the elements CSTp or CSTn for gating the appropriate thyristors Thpk and Thnk, respectively. However, a complementary channel of energy is provided to restore the energy in the storage capacitors CSTp and CSTn by way of current transformers Tpk and Tnk. These transformers may be of the type that have a relatively thin gapped core which can be nested over the anodes of thyristors Thpk and Thnk. These transformers may, in effect, have a single primary turn which carries the positive or negative half cycle of switch current. The secondary turn provides sufficient voltage and current to recharge the storage capacitor of the opposite thyristor in each case. For example, current flowing in the anode circuit of the thyristor Thpk will be picked up by the current transformer Tpk and provided to charge the storage capacitor CSTn. Likewise, current flowing in the anode circuit of the thyristor Thnk will be picked up by the current transformer Tnk and be utilized to charge the storage capacitor CSTp. Consequently, it can be seen that regardless of the status of the voltage across the thyristor Thnk in a previous half cycle, if current had flown through the thyristor Thpk in that previous half cycle, storage energy will be available for a subsequent gating of the thyristor Thnk. This is true even though full blocking voltage had not been developed across the thyristor Thnk. The same may be said with respect to the action of the thyristor Thpk.

The pulse generating circuit for the light pulses is shown to the left in FIG. 4. As was described with respect to the embodiments of FIG. 3, there may be three pulse generating circuits PG12, PG23, and PG31. For purposes of simplicity of illustration, an exemplary embodiment of a pulse generating circuit is shown with respect to the pulse generating circuit PG31. In this case, the storage capacitive element CF is interconnected at one end with three resistive elements RLp, RLn and RC. Connected to the other terminal of the resistive element RC is an appropriate positive voltage V+. Connected to the other side of the resistive element RLp is one input terminal of a light emitting diode set LEDpk. Connected in series therewith are other parallel combinations of light emitting diodes LEDpk′ and LEDp1. The other terminal of the light emitting diode set LEDp1 is connected to the collector of a transistor Trp, the emitter of which is connected to the other side of the previously described capacitor CF and negative power supply terminal V−. Its base is connected to the line α31p from the αGEN. Connected to the other terminal of the resistive element RLn is an input terminal of a parallel combination of light emitting diodes LEDnk. Connected in series therewith are parallel combinations of light emitting diodes LEDnk′ and LEDn1. The output of the light emitting diode set LEDn1 is connected to the collector of a second transistor Trn, the emitter of which is also connected to the other side of the capacitive element CF and to negative power supply terminal V−. The base of transistor Trn is connected to the 31n output terminal of the alpha generator GEN. Connected in light receiving arrangement with the various positive light emitting diode arrays is the light pipe bundle LPp(31) which is interconnected with the various light actuated switches LAS, LAS', etc. Connected in light receiving arrangement with the negative light emitting diodes is the light pipe arrangement LPn(31), which pipes are interconnected at the other end thereof with the light actuated switches LAS, LAS' associated with the negative conducting thyristors Thnk, Thnk', etc. Energization of the light emitting diodes, as caused by conduction of the transistors Trp and Tnp, will produce light which is transmitted therefrom though the light pipes LPp(31) and LPn(31), as the case may be, to the appropriate light activated switches for causing a conduction state to exist for the various thyristors shown in the switch arrangement 11. The current pulse necessary to illuminate the various light emitting diodes is provided by discharging the capacitive element CF through the light emitting diodes by way of current limiting resistors RLp or RLn. As was mentioned previously, the discharge path is closed when the appropriate trigger pulse α31p, α31n, etc. is applied to the base of the appropriate transistor. After such a current pulse is delivered, the capacitive element CF may be relatively slowly recharged through charging resistor RC to provide the required charge for subsequent light pulse generation. With regard to the stack apparatus 11 shown to the right in FIG. 4, energy for charging the various storage capacitors CSTp, CSTn, etc. may be made available during each half cycle, even though there is no previous substantial period of nonconduction for the main thyristor.

It is to be understood with respect to the embodiments of this invention that they are not limited to use in converters or VAR generators although these apparatuses enjoy substantial success at relatively high voltages because of the utilization of the apparatus taught herein. It is also to be understood that the apparatus is not limited to single or three phase AC application or DC application, but may be used in combinations, including use in circuit apparatus in which it is necessary to use stacks of switched thyristor devices for which the charging energy is to be made locally available at the local potential of the switch device. It is also to be understood that some variation in the described circuits may be utilized. In converter bridge applications, as described previously, the current transformers may be located in the vicinity of the cathode of a given thyristor and used to replenish the charge of the storage capacitor assigned to the thyristor as shown in FIGS. 1 and 2. In AC applications, a single core may be used to embrace both the positive and negative thyristor leads. Furthermore, a magnetic core equipped with two secondaries can service both thyristors in a pair. It is also conceivable to employ a single current transformer with a multiplicity of secondaries to serve several series connected thyristors.

The apparatus taught with respect to the present invention has many advantages. One advantage lies in the fact that a circuit which provides gating energy may exist at the cathode potential of the circuit to which the gating energy is to be supplied. Furthermore, the components which are utilized in the charging and discharging circuits are generally at the cathode potential of the device they are to serve. This eliminates insulation problems between the control system and the device to be gated and significantly reduces the effect of stray capacitance. Other advantages lie in the fact that the number of electrical interconnections between ground and cathode potential may be reduced, the size of the transformers required for supplying energy may be reduced as well as the volume and space requirement associated therewith. Another advantage lies in the safety associated with having no electrical interconnections between ground potential and high voltage potential in the apparatus of the present invention, it being remembered that control information is provided by way of insulating light pipes rather than electrical conductors and, of course, the fact that the energy is produced at local potentials rather than at ground potential.

What we claim as our invention is:

1. A current-actuated switch, comprising:
   (a) switch means with main conducting terminals for interconnection with a circuit to be controlled by said switch means and with an actuating terminal for causing said switch means to conduct current at said main terminals thereof when said actuating terminal is energized with a predetermined value of energy;
   (b) first electrical energizing means disposed in cooperation with a conductor in which electrical current flows, said first electrical energizing means having a first electrical energizing means output terminal which provides electrical energy in relation to said electrical current;
   (c) second electrical energizing means disposed in cooperation with said main terminals of said switch means, said second electrical energizing means having a second electrical energizing means output terminal which provides electrical energy in relation to said voltage drop; and
   (d) energy storage means interconnected with said actuating terminal, said first electrical energizing means output terminal and said second electrical energizing means output terminal for storing energy which is provided to said energy storage means by either of said first or second electrical energizing means and for releasing energy of said predetermined value from said energy storage means for said actuating terminal at an appropriate time for causing said actuating switch means to conduct.

2. The combination as claimed in claim 1 wherein said conductor with which said electrical energizing means is disposed in cooperation is connected to one main terminal of said switch means so that said switch means is self-energizing.

3. The combination as claimed in claim 2 wherein said energy storage means comprises capacitor means.

4. A current actuated switch, comprising:
   (a) thyristor means with main conducting terminals for interconnection with a circuit to be controlled by said thyristor means and with a gate terminal for causing said thyristor means to conduct current through said main terminals thereof when said gate terminal is energized with a predetermined value of energy; and
   (b) current transformer means disposed in cooperation with an electrical conductor in which electrical current flows, said current transformer means having a switch-controlled output terminal which provides electrical energy in relation to said electrical current when switched on, said output terminal being interconnected with said gate terminal, said thyristor means thus becoming conductive at said main terminals thereof when said electrical energy provided at said output terminal of said current transformer means attains said predetermined value and when said switch-controlled output terminal is switched on.

5. A converter, comprising:
(a) an A.C. portion;
(b) a D.C. portion; and
(c) first switch means with main conducting terminals, one of which is connected in circuit relationship with a conductor in said D.C. portion and another of which is connected in circuit relationship with a conductor in said A.C. portion for converting A.C. to D.C. or vice versa as desired, said switch means having an actuating terminal for causing said switch means to conduct said direct current when said actuating terminal means is energized with a predetermined value of energy, electrical energizing means disposed in cooperation with one of said conductors, said energizing means having a switch-controlled output terminal which provides electrical energy in relation to the electrical current flowing therein when switched on, said output terminal being interconnected with said actuating terminal, said switch means thus being conductive at said main terminals thereof when said electrical energy provided at said output terminal of said energizing means attains said predetermined value and when said switch-controlled output terminal is switched on.

6. A converter, comprising:
(a) an A.C. portion;
(b) a D.C. portion;
(c) first switch means with main conducting terminals one of which is connected in circuit relationship with a conductor in said D.C. portion and another of which is connected in circuit relationship with a conductor in said A.C. portion for converting A.C. to D.C. or vice versa as desired, said switch means having an actuating terminal for causing said switch means to conduct said direct current when said actuating terminal means is energized with a predetermined value of energy, electrical energizing means disposed in cooperation with one of said conductors, said energizing means having an output terminal which provides electrical energy in relation to the electrical current flowing therein; and
(d) energy storage means interconnected with said actuating terminal and said output terminal for storing energy which is provided to said energy storage means by said energizing means and for releasing energy of said predetermined value from said energy storage means to said actuating terminal at an appropriate time for making said switch means conductive.

7. The combination as claimed in claim 6 wherein said energy storage means comprises capacitor means.

8. A current actuated bipolar switch, comprising:
(a) first unidirectional switch means with main conducting terminals for interconnection with a circuit to be controlled by said first switch means and with an actuating terminal for causing said first switch means to conduct current at said main terminals thereof when said actuating terminal is energized with a predetermined value of energy;
(b) second unidirectional switch means with main conducting terminals for interconnection with said circuit to be controlled by said second switch means in the opposite circuit polarity relative to said first switch means, said second switch means having an actuating terminal for causing said second switch means to conduct current at said main terminals thereof when said latter actuating terminal is energized with a second predetermined value of energy;
(c) first electrical energizing means disposed in cooperation with said main terminals of said first switch means, said first electrical energizing means having an output terminal which provides electrical energy in relation to the current flow at said main terminals of said first switch means;
(d) second electrical energizing means disposed in cooperation with said main terminals of said second switch means, said second electrical energizing means having an output terminal which provides electrical energy in relation to the current flow at said main terminals of said second switch means;
(e) first energy storage means interconnected with said actuating terminal of said first switch means and said output terminal of said second electrical energizing means for storing energy which is provided thereto by said second energizing means and for releasing energy of said first predetermined magnitude to said latter actuating terminal at an appropriate time for making said main terminal of said first switch means conductive; and
(f) second energy storage means interconnected with said actuating terminal of said second switch means and said output terminal of said first electrical energizing means for storing energy which is provided thereto by said first energizing means and for releasing energy of said second predetermined magnitude to said latter actuating terminal at an appropriate time for making said main terminals of said second switch means conductive.

9. The combination as claimed in claim 8 comprising alternative energizing means which are interconnected with said first and said second energy storage means for supplying energy thereto as an alternative to said first and said second electrical energizing means.

10. A VAR generator, comprising:
(a) reactance means for producing VAR's in relationship to the conduction intervals of bipolar switch means which are connected thereto;
(b) first unidirectional switch means with main conducting terminals for interconnection with said reactance means and with an actuating terminal for causing said first switch means to conduct current at said main terminals thereof when said actuating terminal is energized with a predetermined value of energy;
(c) second unidirectional switch means with main conducting terminals for interconnection with said reactance means in the opposite circuit polarity relative to said first switch means, said second switch means having an actuating terminal for causing said second switch means to conduct current at said main terminals thereof when said latter actuating terminal is energized with a second predetermined value of energy;
(d) first electrical energizing means disposed in cooperation with said main terminals of said first switch means, said first electrical energizing means having an output terminal which provides electrical energy in relation to the current flow at said main terminals of said first switch means;

(e) second electrical energizing means disposed in cooperation with said main terminals of said second switch means, said second electrical energizing means having an output terminal which provides electrical energy in relation to the current flow at said main terminals of said second switch means;

(f) first energy storage means interconnected with said actuating terminal of said first switch means and said output terminal of said second electrical energizing means for storing energy which is provided thereto by said second energizing means and for releasing energy of said first predetermined magnitude to said latter actuating terminal at a time which is related to said conduction interval for making said main terminal of said first switch means conductive for producing said VAR's; and (g) second energy storage means interconnected with said actuating terminal of said second switch means and said output terminal of said first electrical energizing means for storing energy which is provided thereto by said first energizing means and for releasing energy of said second predetermined magnitude to said latter actuating terminal at a time which is related to said conduction interval for making said main terminals of said second switch means conductive for producing said VAR's.

11. The combination as claimed in claim 8 comprising alternative energizing means which are interconnected with said first and said second energy storage means for supplying energy thereto as an alternative to said first and said second electrical energizing means.

12. The combination as claimed in claim 10 wherein said VAR's are produced at relatively high electrical potential.

13. The combination as claimed in claim 10 wherein said energy is in the form of electrical charge.

14. The combination as claimed in claim 11 wherein said VAR's are produced at relatively high electrical potential.

15. The combination as claimed in claim 11 wherein said energy is in the form of electrical charge.

16. The combination as claimed in claim 14 wherein said energy is in the form of electrical charge.

* * * * *